(12) United States Patent
Bahattab

(10) Patent No.: US 12,284,035 B2
(45) Date of Patent: Apr. 22, 2025

(54) HIGH-SPEED DATA TRANSMISSION USING SHORT CRC

(71) Applicant: Abdullah Ali Bahattab, Jeddah (SA)

(72) Inventor: Abdullah Ali Bahattab, Jeddah (SA)

(*) Notice: Subject to any disclaimer, the term of this patent is extended or adjusted under 35 U.S.C. 154(b) by 0 days.

(21) Appl. No.: 18/129,673

(22) Filed: Mar. 31, 2023

(65) Prior Publication Data
US 2024/0333425 A1    Oct. 3, 2024

(51) Int. Cl.
*H04L 1/00*    (2006.01)

(52) U.S. Cl.
CPC .......... *H04L 1/0061* (2013.01); *H04L 1/0041* (2013.01); *H04L 1/0045* (2013.01)

(58) Field of Classification Search
CPC .... H04L 1/0061; H04L 1/0045; H04L 1/0041
See application file for complete search history.

(56) References Cited

U.S. PATENT DOCUMENTS

| | | | | |
|---|---|---|---|---|
| 5,987,034 A | * | 11/1999 | Simon ................ | H04Q 11/0478 370/465 |
| 8,402,343 B2 | * | 3/2013 | Radulescu ............ | H04L 1/0061 714/758 |
| 2003/0103521 A1 | * | 6/2003 | Raphaeli ............... | H04L 1/0007 370/473 |
| 2003/0118053 A1 | * | 6/2003 | Edsall ................. | H04L 67/1097 370/474 |
| 2008/0195912 A1 | * | 8/2008 | Mende .................. | H04L 1/1809 714/752 |
| 2011/0161777 A1 | * | 6/2011 | Radulescu .......... | H03M 13/091 714/E11.03 |
| 2012/0324322 A1 | * | 12/2012 | Vedantham ......... | G06F 11/1004 714/E11.032 |
| 2019/0306281 A1 | * | 10/2019 | Masputra .............. | H04L 61/103 |

* cited by examiner

*Primary Examiner* — Samir W Rizk (57) ABSTRACT

The present invention relates generally to a method for high-speed data transmission using short CRC in a communications network. More particularly, the invention encompasses use of more than one CRC to overcome network delays. A frame is partitioned into a frame header and a frame trailer at a source before transmitting to a destination wherein the frame header has a header CRC and the frame trailer has a trailer CRC for error detection.

11 Claims, 5 Drawing Sheets

HIGH-SPEED DATA TRANSMISSION USING SHORT CRC

This application claims the benefit of the provisional application No. 63/335,171 filed Apr. 26, 2022.

FIELD OF THE INVENTION

The present invention relates to the field of high-speed transmission of frames/data packets in a communications network.

BACKGROUND OF THE INVENTION

High speed data transmission has become very important in worldwide data connectivity. New access technologies like DSL, last mile fiber optic links, and wireless connections place a strain on routers, particularly backbone routers, due to the increasing traffic that is routed through ISPs (Internet Service Providers). Most IP packets traverse various networking equipment with various network semantics during their journey from source to destination, including packet forwarding routers, frame relays, MPLS, ATM, etc.

Rapid growth in the usage of the cloud-based services such as data storages, web services, and social media applications have significantly increased the data traffic within data centernetworks. The increased data traffic has been very difficult for the current technologies to handle and manage the data traffic without degradation in transmission speeds. Also, in order to manage the increased data traffic, the data center networks require thousands of servers and switches to handle the enormous amount of data.

In various existing network systems, packet data forwarding is generally performed on a packet-by-packet basis by a network node (or a packet forwarding device). Specifically, the packet forwarding device performs table lookup based on information such as a destination address, tag, index etc. to forward packets/frames. Cyclic Redundancy Check (CRC) is widely used in these systems for error detection when the data packets are received at the packet forwarding devices. The CRC produces a strong kind of checksum is called Cyclic Redundancy Code. Any type of mathematical procedure that you may apply to data to ensure that the bits do not unintentionally flip while being stored in a memory or sent over a network is known as a checksum. A CRC is particularly potent sort of checksum, mostly due to the fact that it is highly challenging to manipulate a CRC. Normal CRC causes time delays in the transmission.

Therefore, there is a need for new methods and systems that reduces the transmission delays and increase the transmission speeds.

SUMMARY OF THE INVENTION

This invention overcomes the disadvantages of the prior art/conventional/traditional systems/methods by providing advanced technical solutions based on a novel approach in high speed data packet/frame transmission in a communications network.

The invention provides a method of transmitting one or more frames between a source (510) and a destination (550) within a communications network, the method comprising: a) partitioning by the source (510), each frame into a frame header comprising a header CRC and a frame trailer; b) calculating by the source (510), the header CRC for the frame header and the trailer CRC for the frame trailer of the partitioned frame for error detection; c) combining by the source (510), the frame header and the frame trailer; d) transmitting the combined frame from the source (510) to the first network node (520) towards the destination (550) e) receiving and partitioning by the first network node (520), the transmitted frame into the frame header and the frame trailer; f) calculating by the first network node (520), the CRC for the frame header and checking and/or manipulating the frame header and recalculating by the first network node (520), the CRC, only for the frame header; g) combining by the first network node (520), the frame header and the frame trailer subsequent to the calculation of the CRC for the frame header; h) transmitting the combined frame from the first network node (520) to the subsequent node (530) of the one or more network nodes towards the destination (550) and repeating by the subsequent node (530), the steps of receiving the frame, partitioning of the frame, calculating the CRC for the frame header, checking and/or manipulating the frame header and recalculating the CRC only for the frame header of the transmitted frame until the frame arrives at the destination (550); i) receiving the transmitted frame by the destination 550 and partitioning by the destination (550), the received frame into the frame header and the frame trailer; j) calculating/checking by the destination (550), the CRC for the frame header and the CRC for the frame trailer of the partitioned frame for error detection; and k) processing the CRC calculated/checked frame by the destination 550, in response to the calculation for error detection.

BRIEF DESCRIPTION OF THE DRAWINGS

Various embodiments of a method for facilitating high speed data packets/frames transmission through a communications network are described below. The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

DETAILED DESCRIPTION OF THE INVENTION

Various embodiments now will be described more fully hereinafter with reference to the accompanying drawings. It should be understood that the invention may be embodied in many different forms and should not be construed as limited to the embodiments set forth herein. The following detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention. It should be understood that the drawings are diagrammatic and schematic representations of exemplary embodiments of the invention, and are not limiting of the present invention nor are they necessarily drawn to scale.

Figure 5:
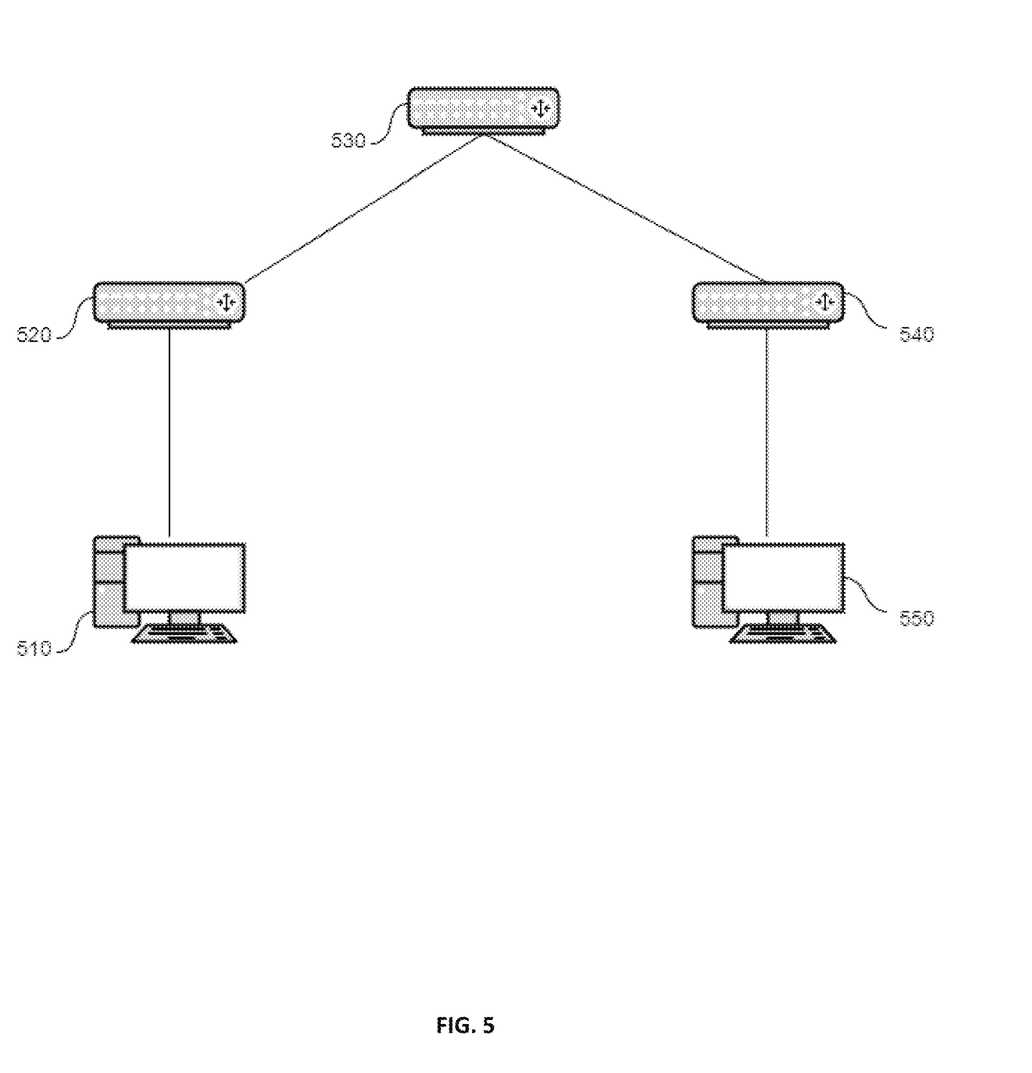
FIG. 5 is an exemplary frame switching/routing network with three network nodes between a source 510 and a destination 550.

The following detailed description is directed to a method of transmitting frames/data packets between a source 510 and a destination 550 as shown in FIG. 5. The source 510 and destination 550 can be but not limited to workstations, devices or apparatus. The source 510 and destination 550 further includes data link layer addresses for identification within a communications network.

Figure 1:
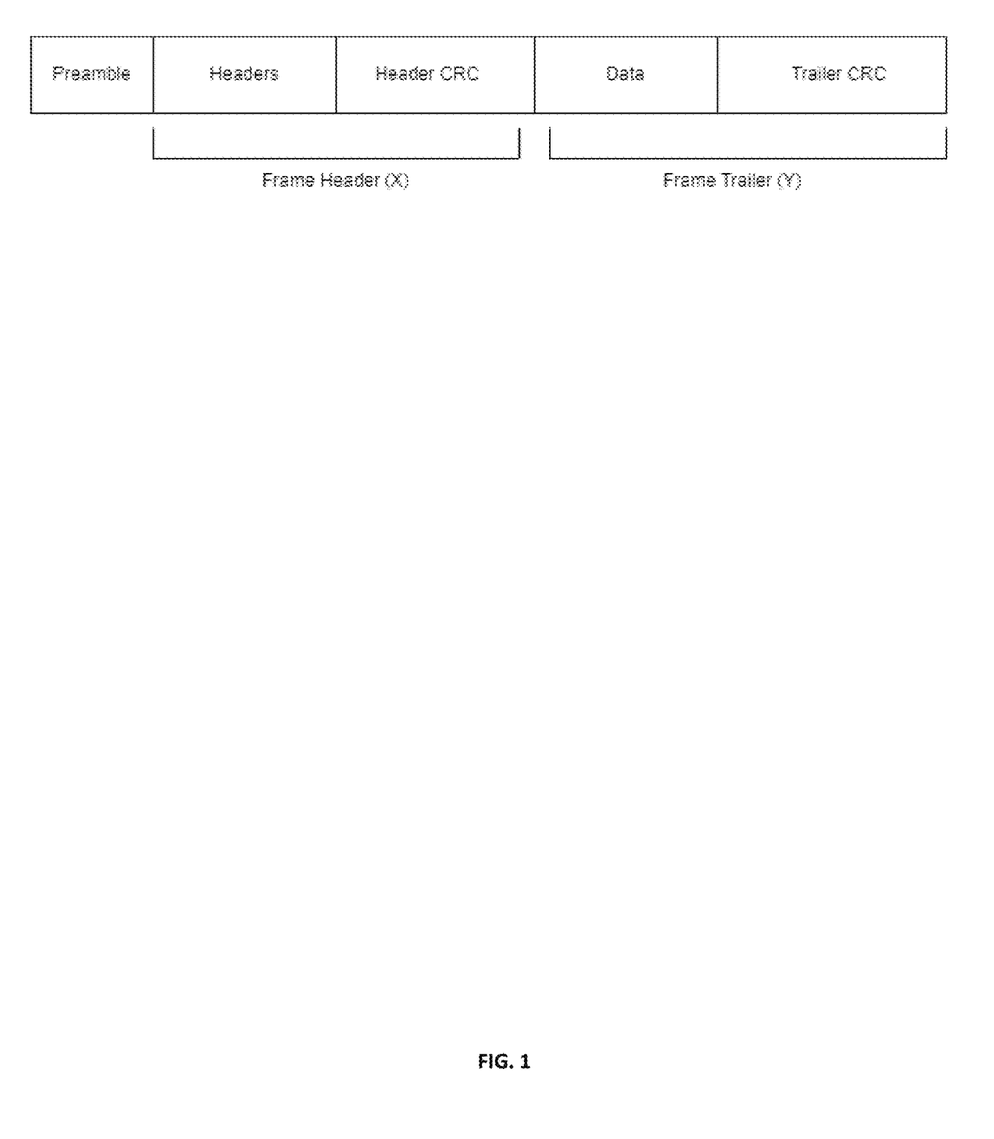
FIG. 1 depicts an exemplary frame with more than one CRC according to one embodiment.

FIG. 1. Depicts a Novel frame structure that consists of more than one CRC for error detection. According to the invention the novel frame structure achieves high speed data transmission within a communications network without a delay in the transmission. The frame/data packet is partitioned in to two segments i.e. a frame header and a frame trailer wherein, the frame header consists of a control field and a header CRC and the frame trailer consists of data field to store data and a trailer CRC for error detection.

Figure 2:
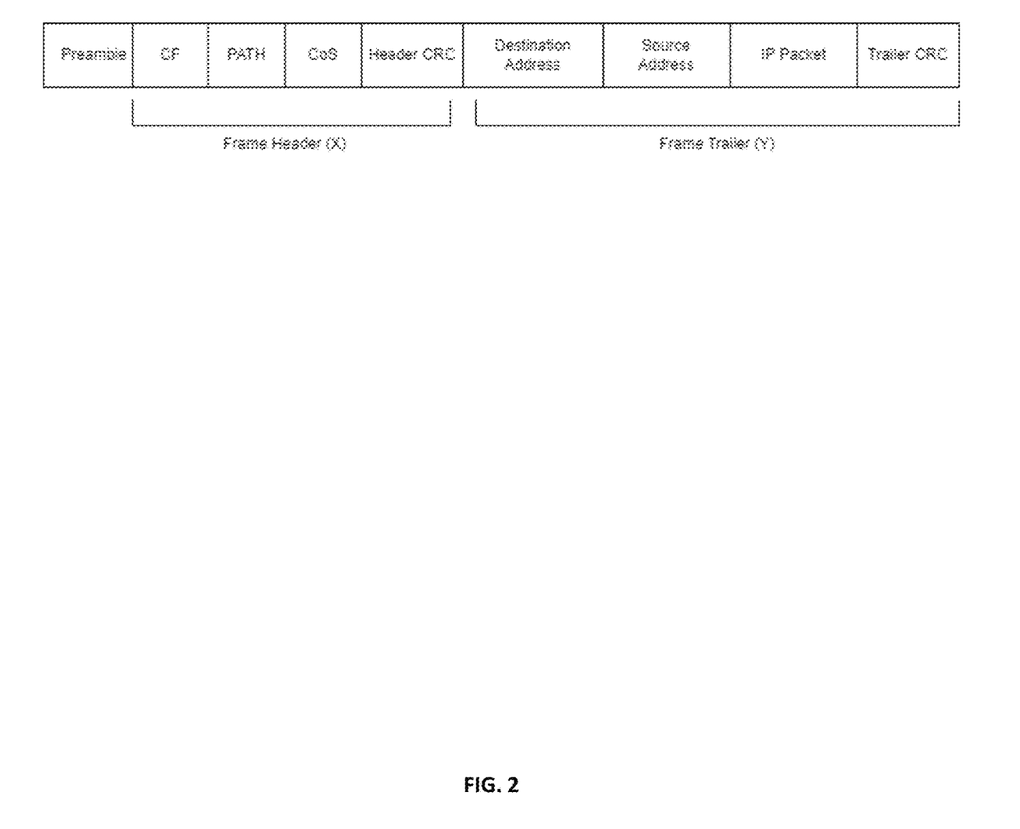
FIG. 2 shows a short CRC frame structure for Local Area Network (LAN) in one aspect of the invention.

FIG. 2. Illustrates the Novel frame structure for Local Area Network (LAN) that includes partitioning of the whole frame in to two partitions i.e. a Frame Header and a Frame Trailer. The Frame Header consists of a Control Field, Path field, Class of Service field and a Header CRC. The Frame Trailer consists of a Destination 550 Address, a Source 510 Address, IP/Data packet field and Trailer CRC. The both CRC's are used for error detection.

In some embodiments, in order for a frame to reach from a source 510 to a destination 550 it is passed through different networking nodes/devices such as switches (distribution, access, and core switches)/routers. According to the novel frame structure, only the control field, path, and header CRC are calculated at each networking device. However, the trailer CRC is calculated when the frame reaches the destination 550. The whole process of frame transfers and CRCs and its calculation is straightforward. The source 510 transmits the frame to reach the destination 550 based on the path details stored in the path field at the frame header. Accordingly, the frame is sent to the first network node 520. At the first network node 520, only header CRC is checked and recalculated before sending it to the next network node. The same process is repeated at each network node in the network until the frame reaches the destination 550. When the frame reaches the destination 550, then the trailer CRC is calculated, and if there is no error found in the frame, the frame is processed further. Else, the frame is dropped by the destination 550 and retransmission of the frame is requested by the transport layer for the same frame.

Figure 3:
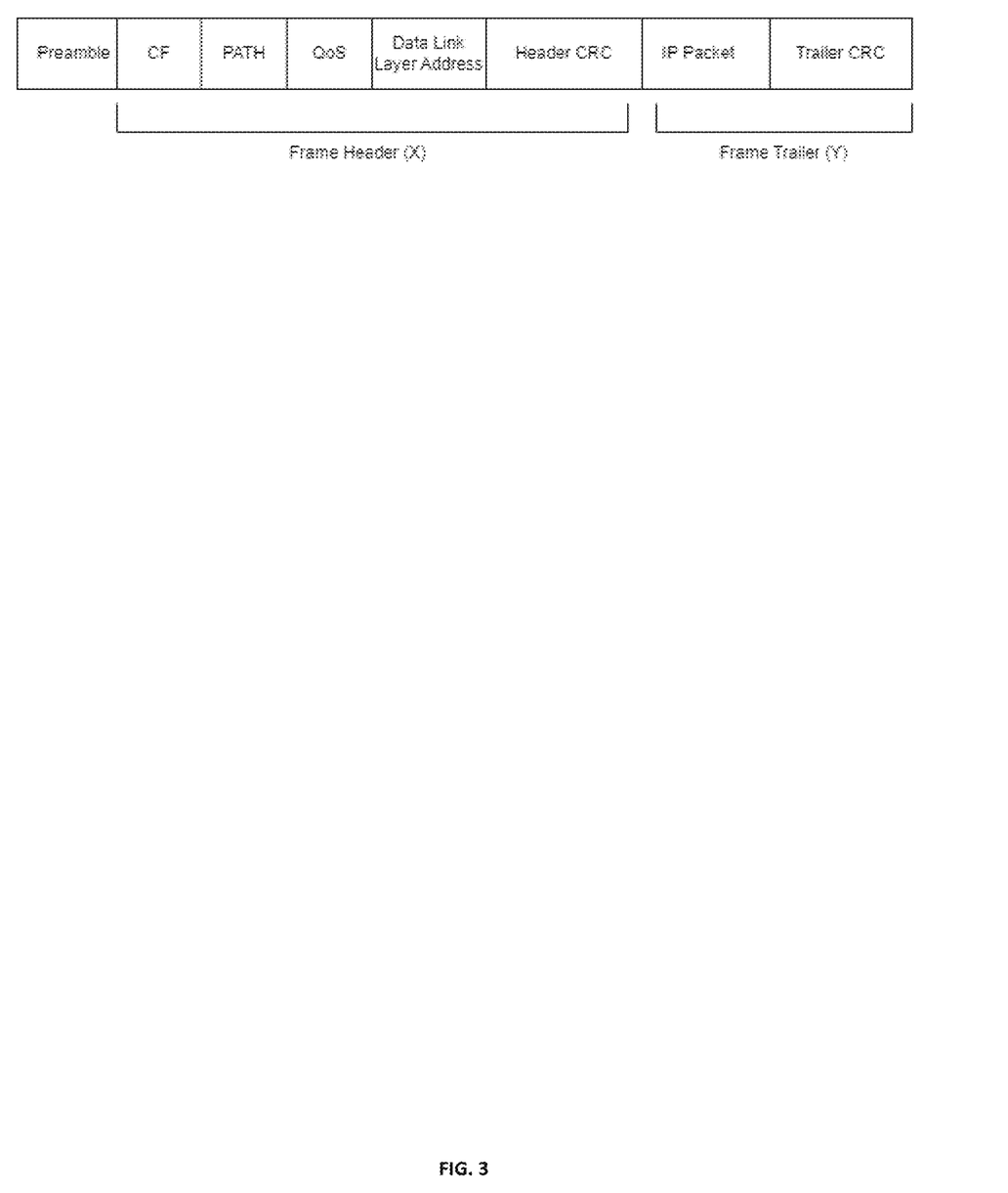
FIG. 3. shows a short CRC frame structure for Wide Access Network (WAN) in one aspect of the invention.

FIG. 3. Illustrates the Novel frame structure for Wide Area Network (WAN) that includes partitioning of the whole frame in to two partitions i.e. a Frame Header and a Frame Trailer. The Frame Header consists of a Control Field, Path field, Quality of Service field, Data Link Layer Address field and a Header CRC. The Frame Trailer consists of an IP/Data packet field and Trailer CRC. The both CRC's are used for error detection.

In some embodiments, the process of transmission of the frame over a WAN is not complicated. The source has the path information to be utilized in the transmission of data packets/frames from the source to the destination. The process starts when the frame moves from the source and reaches a network node. At the network node, the control field, the path, and the data link layer address are calculated using the header CRC while the rest of the IP packet is calculated using the trailer CRC. Then the frame is sent to the next network node where only the control field, the path and the data link layer address are calculated using the header CRC. Subsequently, the frame is sent to the next network node. This process is continued until the frame reaches its destination. When the frame reaches the destination, both CRCs are calculated, and if no error is found, the frame is processed. Else, the frame is discarded, and the transport layer requests the retransmission of the discarded frame.

In some embodiments, wherein when the invention is implemented in Wide Area Network (WAN), the source and the destination can be the network devices and the process of transmission of the frames cab be between the network devices.

In some embodiments, for the transmission of the frames/data packets from a source 510 to a destination 550 within a communications network various protocols like for e.g. packet switching, cut through switching, TCP/IP, segment routing, Route Once and Cross-Connect many (ROACM) etc. can be utilised. For example, when ROACM is integrated with CRC, which means there are two CRCs (CRC-ROACM and DLT CRC). The data transmission stage uses the same process of sending the IP packet from the source to the destination PC, which is performed during the acknowledgment stage. First of all, the source PC calculates the whole frame using CRC-ROACM and DLT CRC and sends the packet to first network node. The first network node recalculates the Frame Header (X) part of the frame using CRC-ROACM. It will not check the Frame Trailer (Y) part of the frame. After the calculation, if no error is found, the first network node will check the first port number in the ROACM header and then, the first network node pops off the particular index from the header, recalculates only the CRC-ROACM, and sends the frame to the next network node via the particular Port number. This process is performed by all switches/routers/network nodes in the path. When the IP packet/frame/data packet reaches the destination PC and no error is shown after calculating both CRCs, the packet is then sent to the upper layers for processing, otherwise, it is dropped and the transport layer at the destination PC sends a request for retransmission.

Figure 4:
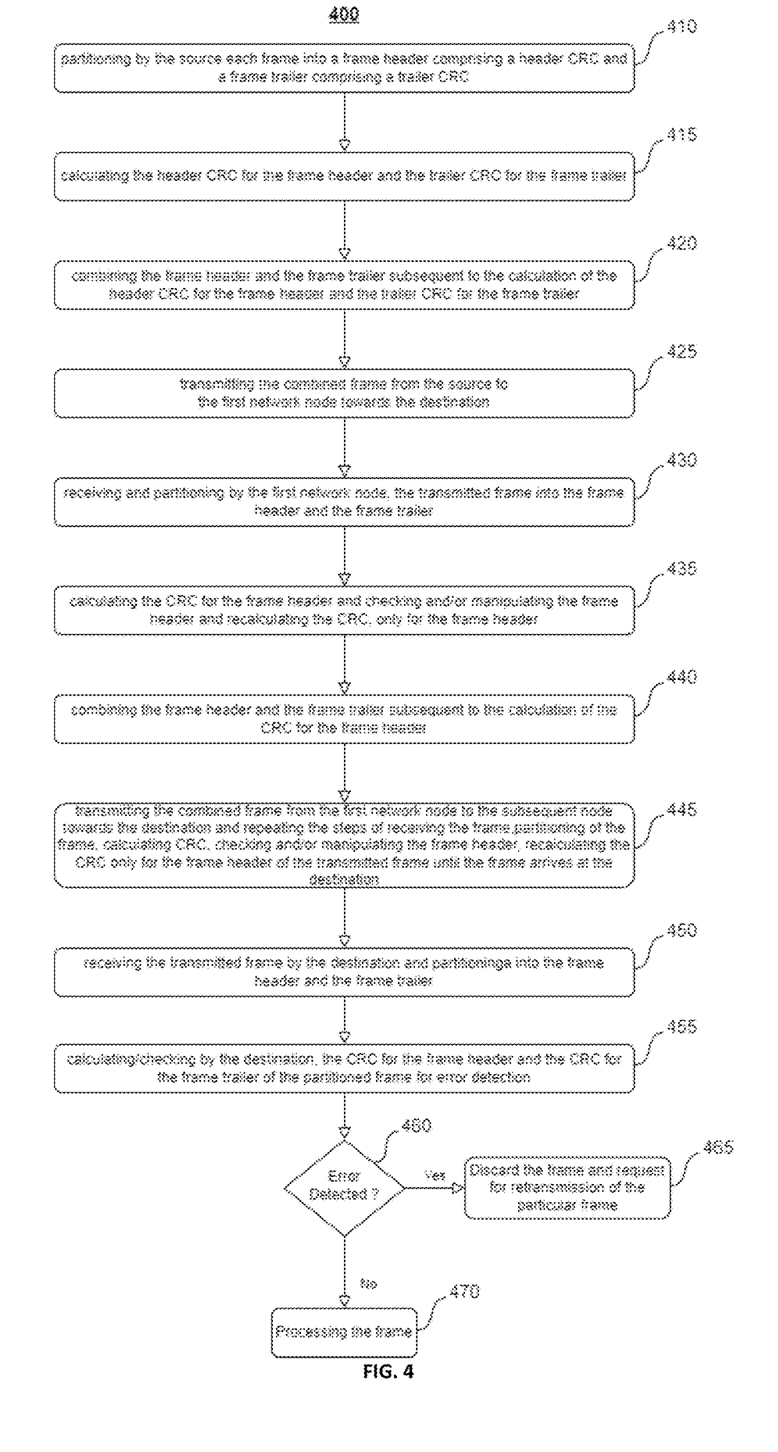
FIG. 4. Shows a flow chart of a frame switching/routing process according to an embodiment of the invention.

FIG. 4. Is a flow diagram of a frame routing process 400 to facilitate transmission of a frame from a source 510 to a destination 550 within a communications network according to some implementations.

At step 410, the routing process 400 can include partitioning by the source 510, each frame of the one or more frames into a frame header comprising a header CRC and a frame trailer comprising a trailer CRC for error detection. In some implementations, the frame can be but not limited to a data packet, an IP packet or a data stream.

At step 415, the routing process 400 can include calculating by the source 510, the header CRC for the frame header and the trailer CRC for the frame trailer of the partitioned frame for error detection. In some embodiments, the source 510 and the destination 550 can be but not limited to a workstation, a PC, a device or an apparatus.

At step 420, the routing process 400 can include combining by the source 510, the frame header and the frame trailer of the partitioned frame subsequent to the calculation of the header CRC for the frame header and the trailer CRC for the frame trailer.

At step 425, the routing process 400 can include transmitting the combined frame from the source 510 to the first network node 520 of the one or more network nodes towards the destination 550. In some implementations the network nodes can be but not limited to packet handling devices, switches or routers.

At step 430, the routing process 400 can include receiving and partitioning by the first network node 520, the transmitted frame into the frame header and the frame trailer.

At step 435, the routing process 400 can include calculating by the first network node 520, the CRC for the frame header and checking and/or manipulating the frame header and recalculating by the first network node 520, the CRC, only for the frame header. In some implementations manipulating the frame header includes updating the path.

At step 440, the routing process 400 can include combining by the first network node 520, the frame header and the frame trailer subsequent to the recalculation of the CRC for the frame header.

At step 445, the routing process 400 can include transmitting the combined frame from the first network node 520 to the subsequent node 530 of the one or more network nodes towards the destination 550 and repeating by the subsequent node 530, the steps of receiving the frame, partitioning of the frame, calculating the CRC for the frame header, checking and/or manipulating the frame header and recalculating the CRC only for the frame header of the transmitted frame until the frame arrives at the destination 550.

At step 450, the routing process 400 can include receiving the transmitted frame by the destination 550 and partitioning by the destination 550, the received frame into the frame header and the frame trailer.

At step 455, the routing process 400 can include calculating/checking by the destination 550, the CRC for the frame header and the CRC for the frame trailer of the partitioned frame for error detection.

At step 460, the routing process 400 can include determining whether an error is detected within the received frame or not at the destination 550.

At step 465, the routing process 400 can include discarding of the frame if the error is detected at step 460 and requesting the source 510 for the retransmission of the same frame.

At step 470, the routing process 400 can include processing of the frame as there is no error detected in the frame at the step 460. The processed frame is forwarded to the upper layer.

FIG. 5 shows a typical system operation. If a connection is established with three network nodes between a source 510 and a destination 550, the frame will be transmitted from the source 510 to the first network node 520 and from the first network node 520 to the subsequent network node 530 until it reaches to the destination 550. The frame will go through various steps as discussed in the method described in the detailed description.

In some embodiments, the frame trailer is encrypted/compressed by using encryption/compression/cryptographic technologies at the source 510 before transmitting to the destination 550 and the encrypted/compressed frame can only be decrypted/decompressed only at the destination 550 to maintain data security and integrity.

In some embodiments, Devices/Apparatuses for carrying out cyclic redundancy code (CRC) checks are described below. These devices/apparatuses may receive a data stream. The data stream may be received in the form of single data symbols or may be received in the form of blocks of data or data packets such as data frames, data words, code blocks, transport blocks, etc. The received data may consist of or may be regarded as or may be divided into blocks of a given length. For example, the received data stream may contain symbols that indicate where a block starts, where a block ends, or which length a block may have.

In some embodiments, the data bits in the frames/data packets do not necessarily show up in the same order as in the received frames, and the frames/data packets do not necessarily include the data bits in the same order as in the received frames/data packets.

In some embodiments, the frame/data packet can correspond to a predefined protocol, as, for example, the TCP/IP, the ROACM, the segment routing, the packet switching or the cut through switching. The predefined protocol may determine, which ones of the bits of a frame/data packet belong to the frame header and which ones of the bits of the frame belong to the frame trailer.

In some embodiments of the invention can further comprise a computer program having a program code for performing one of the above described methods when the computer program is executed on a computer or processor.

In some embodiments, the subsequent network node 530 is determined using one of a plurality of look-up tables. The one look-up table can be selected from the plurality of look-up tables based on the information on the identification of the destination 550 of the frame/data packet. In other words, the CRC check may determine a key or an entry value to a look-up table, which comprises a mapping of the exit interface and/or the network node.

In some embodiments, the frame header for Local Area network (LAN) further includes Class of Service (CoS) field to determine the service quality and update the same in the packet header realtime.

In some embodiments, the frame header for Wide Area network (WAN) further includes Quality of Service (QOS) field to determine the service quality and update the same in the packet header realtime.

Quality of service (QOS) or Class of Service (CoS) is the description or measurement of the overall performance of a service, such as a telephony or computer network, or a cloud computing service, particularly the performance seen by the users of the network. To quantitatively measure quality of service, several related aspects of the network service are often considered, such as packet loss, bit rate, throughput, transmission delay, availability, jitter, etc.

In addition, while a particular feature or aspect of an embodiment of the invention may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Furthermore, it should be understood that embodiments of the invention may be implemented in discrete circuits, partially integrated circuits or fully integrated circuits or programming means. Also, the term "exemplary" is merely meant as an example, rather than the best or optimal. It is also to be appreciated that features and/or elements depicted herein are illustrated with particular dimensions relative to one another for purposes of simplicity and ease of understanding, and that actual dimensions may differ substantially from that illustrated herein.

The functions of the various elements shown in the Figures, including any functional blocks labelled as "means", "means for receiving", "means for inspecting", "means for determining", "means for forwarding", etc., may be provided through the use of dedicated hardware, such as "a receiver", "an inspector", "a determiner", "a forwarder", "a processor", "a controller", "a DSP", etc. as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as magnetic disks and magnetic tapes, hard drives, or optically readable digital data storage media. The embodiments are also intended to cover computers programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

The invention claimed is:

1. A method of transmitting one or more frames between a source and a destination within a communications network, the method comprising:
   a. partitioning by the source, each frame of the one or more frames into a frame header comprising a header CRC and a frame trailer comprising a trailer CRC for error detection;
   b. calculating by the source, the header CRC for the frame header and the trailer CRC for the frame trailer of the partitioned frame for error detection;
   c. combining by the source, the frame header and the frame trailer of the partitioned frame subsequent to the calculation of the header CRC for the frame header and the trailer CRC for the frame trailer;
   d. transmitting the combined frame from the source to the first network node of the one or more network nodes towards the destination;
   e. receiving and partitioning by the first network node, the transmitted frame into the frame header and the frame trailer;
   f. calculating by the first network node, the CRC for the frame header and checking and/or manipulating the frame header and recalculating by the first network node, the CRC, only for the frame header;
   g. combining by the first network node, the frame header and the frame trailer subsequent to the recalculation of the CRC for the frame header;
   h. transmitting the combined frame from the first network node to the subsequent node of the one or more network nodes towards the destination and repeating by the subsequent node, the steps of receiving the frame, partitioning of the frame, calculating the CRC for the frame header, checking and/or manipulating the frame header and recalculating the CRC only for the frame header of the transmitted frame until the frame arrives at the destination;
   i. receiving the transmitted frame by the destination and partitioning by the destination, the received frame into the frame header and the frame trailer;
   j. calculating/checking by the destination, the CRC for the frame header and the CRC for the frame trailer of the partitioned frame for error detection; and
   k. processing the CRC calculated/checked frame by the destination, in response to the calculation for error detection.

2. The method of claim 1, wherein the frame header further includes:
   a) one or more control fields for control information; and/or
   b) one or more path fields for storing a transmission path information; and/or
   c) one or more data link layer addresses.

3. The method of claim 2, wherein the transmission path information stored in the one or more path fields can include ports, tags, indexes or destination addresses.

4. The method of claim 1, wherein the method further comprises, discarding the frame when an error is detected subsequent to calculating/checking the CRC for the frame header or the frame trailer at the destination.

5. The method of claim 1, wherein the frame trailer further includes a data field for data information.

6. The method of claim 1, wherein the frame trailer is compressed or encrypted before transmitting from the source to the first network node and decompressed or decrypted after reaching the destination.

7. The method of claim 1, wherein the communication network can be a Local Area Network (LAN), a Wide Area network (WAN), a wireless communications network, a wired communications network or a Radio Access Network.

8. The method of claim 1, wherein the network nodes can be but not limited to packet handling devices, switches, ad hoc devices, or satellite communication devices.

9. The method of claim 8, wherein the transmission of frames can be between the network nodes in the Local Area Network (LAN) and/or the Wide Area Network (WAN).

10. The method of claim 1, wherein the frame header of the frame further comprises a Class of Service (CoS) field for determining the quality of the data transmission in the Local Area network (LAN).

11. The method of claim 1, wherein the frame header further comprises a Quality of Service (QOS) field for determining the quality of the data transmission in the Wide Area network (WAN).

\* \* \* \* \*